July 12, 1949.
W. S. GULLETTE
2,476,143
PYROLYTIC CONVERSION OF HYDROCARBONS WITH
THE AID OF A FLUIDIZED CATALYST
Filed April 30, 1947
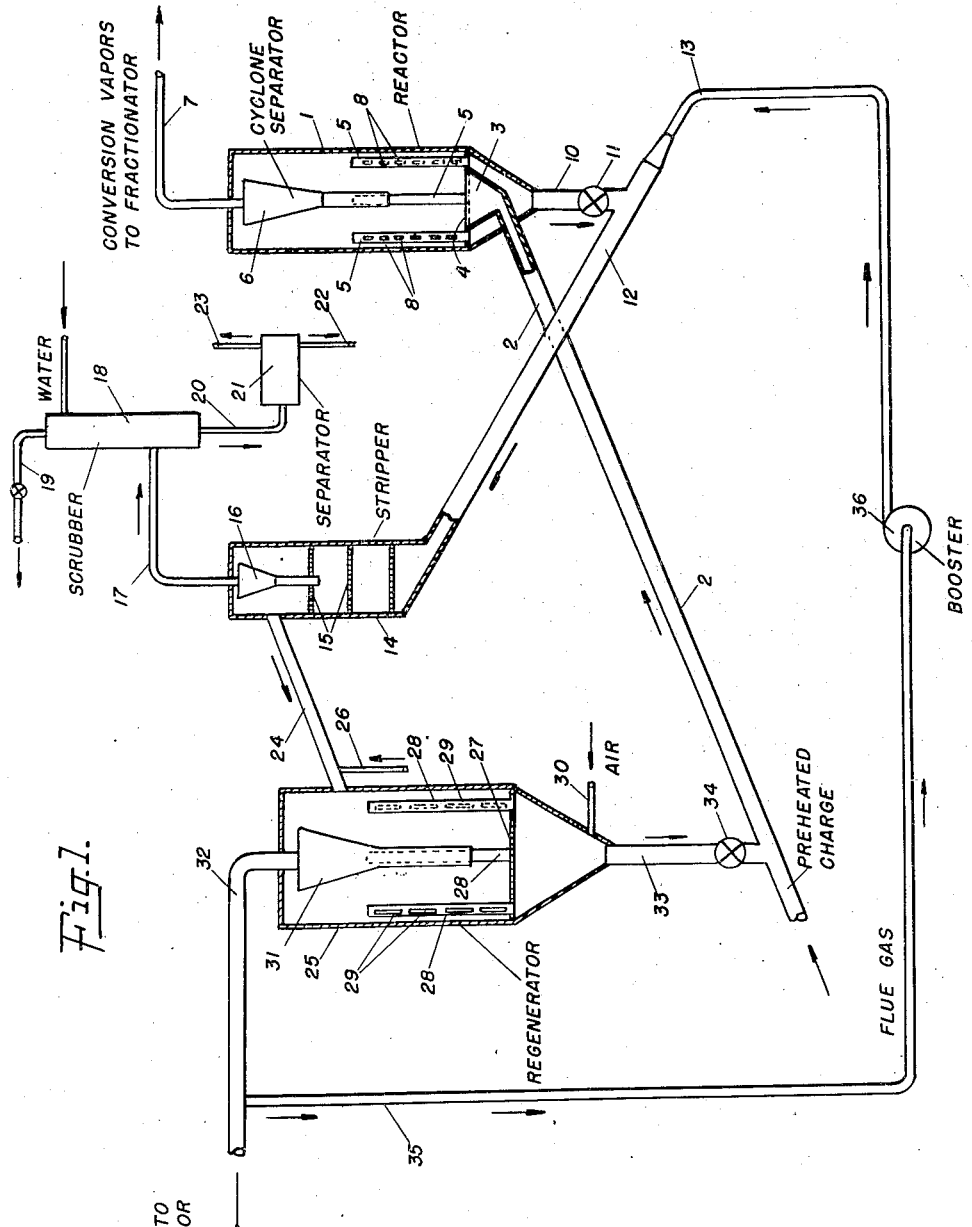
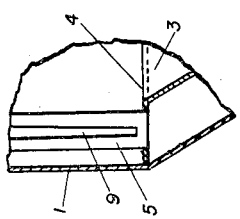
INVENTOR
WILLIS SAWDON GULLETTE
BY
Pennie, Edmonds, Morton & Barrows
ATTORNEYS Patented July 12, 1949

2,476,143

UNITED STATES PATENT OFFICE 2,476,143

PYROLYTIC CONVERSION OF HYDROCARBONS WITH THE AID OF A FLUIDIZED CATALYST

Willis S. Gullette, Highland, Ind., assignor to Sinclair Refining Company, New York, N. Y., a corporation of Maine Application April 30, 1947, Serial No. 745,046

8 Claims. (Cl. 196—52)

This invention relates to the pyrolytic conversion of hydrocarbons and, more particularly, to pyrolytic conversion processes involving the use of a finely divided catalyst.

The invention is especially applicable to conversion processes of the general type wherein a suspension of finely divided catalyst in oil vapors, at an elevated temperature, is passed to a reactor in which conversion of the oil occurs and in which the spent catalyst is separated from the oil vapors, the separated catalyst stripped of oil, regenerated, and the regenerated catalyst again suspended in the stream of oil vapors passing to the reactor.

Operations of the type described are commonly designated fluid catalyst processes. In conventional operation, the spent catalyst from the reaction zone is conveyed, in suspension in a gaseous medium, to a regenerating zone in which carbon deposited on the catalyst particles is burned off by contact with air, and the regenerated catalyst, in fluid suspension, is returned to the reaction zone.

An important consideration in operations of this type, from a practical aspect, is the utilization of the catalyst to the fullest extent possible. For maximum efficiency, it is desirable that all of the catalyst be utilized to an equal extent in the reaction zone and passed to the regenerator and that, in the regenerator, all of the catalyst be uniformly regenerated and returned to the reaction zone.

In operations of this type, the catalyst is usually maintained throughout the operation in a fluidized, i. e., a free flowing condition. However, the catalyst is normally not of uniform density throughout the various stages of the operation.

In the reactor, for instance, there is a relative dense phase body of the catalyst, which is kept fluidized by the hydrocarbon vapors passing therethrough, and from which the spent catalyst is withdrawn for regeneration. A similar dense phase body of the catalyst is maintained in the regenerator, from which regenerated catalyst is withdrawn and returned to the reactor. In both the reaction zone and the regenerating zone there is normally this so-called, "high density" or "dense phase" body of catalyst above which the catalyst, in relatively low concentration, is suspended in the ascending gases, or vapors.

The particles of the catalyst vary considerably in size and there is a tendency for the larger particles to gravitate to the lower portion of the dense phase body of catalyst in the reaction zone and in the regenerating zone, and for the smaller particles to be carried to the upper portion of the dense phase body of the catalyst.

By reason of this tendency toward stratification, the larger particles of the catalyst are normally more rapidly circulated through the system than are the smaller particles. Frequently, a large proportion of the smaller particles of the catalyst is carried off from the regenerator, for instance with the effluent gases to the precipitator, from which it is returned to the regenerating zone and thus repeatedly recycled between the regenerator and precipitator and subjected to a greater period of time than desirable in the regenerating zone, instead of being returned to the reactor. At the same time, larger particles of the catalyst may be too rapidly removed from the regenerating zone before they have been completely regenerated. A similar condition exists in the reactor.

In accordance with my present invention, the lack of uniformity of circulation of the catalyst through the system is, to a major extent, avoided by uniformly withdrawing the catalyst, for recirculation from the reaction zone to the regenerating zone and from the regenerating zone back to the reaction zone, respectively, from over substantially the entire depth of the above described "high density" bodies of the catalyst. This is accomplished by withdrawing the catalyst for recirculation from the catalyst bed, either from a plurality of vertically spaced zones, or uniformly withdrawing catalyst from the bed over substantially the entire height of the high density body of the catalyst in the reaction zone and regenerating zone, respectively.

The invention provides an improved fluid catalyst process and apparatus adapted to continuous operation and comprising a plurality of cooperating steps so coordinated as to constitute a unitary operation in which the charge of catalyst is repeatedly and more uniformly used in the reaction zone and intermittently and more uniformly regenerated and returned to the reaction zone with increased catalytic activity and length of catalyst life.

The invention will be more fully described and illustrated by reference to the accompany drawing in which:

Figure 1 represents conventionally and diagrammatically a flow diagram of a fluid catalyst cracking operation embodying my invention; and Fig. 2 represents a modified means for withdrawing the catalyst uniformly from the high density bed.

The apparatus illustrated by the reference numeral 1 of Fig. 1 of the drawing represents a generally cylindrical reactor. The finely divided catalyst suspended in oil vapors enters the reactor through the conduit 2 extending into the reactor and terminating in a conical member 3 of somewhat smaller maxium diameter than that of the reactor. Just above the conical member 3, there is positioned a plate 4, perforated at its central portion over a diameter equal to the maximum diameter of the conical member 3 and otherwise imperforate except for four openings through the plate spaced 90° apart from which there extend upwardly four risers or standipes 5.

As the hot oil vapors pass upwardly through the reactor there is a tendency for the catalyst to drop out of suspension and gravitate downwardly through the reaction zone forming the "high density" or "dense phase" body of catalyst, as previously described.

The oil vapors, product of the conversion, rise to the top of the reactor, pass through a cyclone separator 6, to remove suspended catalyst from the vapors, the latter passing therefrom through conduit 7 to fractionating apparatus, not shown, and the separated catalyst dropping back into the reactor to a zone thereof below the upper surface of the high density body of catalyst.

Each of the standpipes 5 is provided with slots or other openings 8 in opposite sides thereof, preferably placed at 90° to the radius of the reactor running through the center of the standpipe. These standpipes 5 are preferably of such height as to extend well above the top level of the so-called dense phase. The slots should be spaced along the entire height of the standpipes, or at least to a height equal to that of the dense phase body of the catalyst. The area of the slots should be such that the summation of their areas does not greatly exceed that of the transverse sectional area of the vertical passage through the respective standpipes.

Instead of a plurality of openings 8 placed along the height of the respective standpipes, each standpipe may be provided with a slot on opposite sides thereof, extending the entire height of the standpipe as is indicated in the fragmentary view shown in Fig. 2 of the drawing at 9.

In order further to regulate the flow of the catalyst into the respective standpipes, the slot 9, as shown in Fig. 2 of the drawings, may be of V-shape, being larger at its upper end. Further, the areas of the respective openings 8, shown in the reactor of Fig. 1, may be progressively larger from bottom to top for the same reason. By this arrangement the less dense catalyst from the upper portion of the bed is permitted freer access to the standpipe than is the more dense catalyst at the lower portion of the bed.

The spent catalyst passing downwardly through the standpipes 5 flows into the conical, lower portion of the reactor and passes downwardly through spent catalyst leg 10, in which there is interposed a valve arrangement 11, advantageously of the double slide valve type for regulating the flow of catalyst from the reactor and into conduit 12 where it is caught up by a current of stripping medium introduced through line 13 and carried up into the stripper 14.

The stripping medium introduced through line 13 may be steam, for instance, but in the operation shown, the stripping medium is hot flue gases from the regenerator presently to be described. The spent catalyst leg 10 is, advantageously, of sufficient length to form an effective seal against the upward passage of stripping medium into the reactor.

Oil is partially stripped from the catalyst in transit to the stripper and further stripping is thereafter effected in the stripper. The stripper 14 is provided with a plurality of baffles or perforated plates 15 adapted to retard the passage of catalyst upwardly through the stripper and to promote uniform and prolonged contact between the catalyst and the stripping medium supplied through line 13.

Gaseous products pass from the top of the stripper through a cyclone type separator 16, for the separation of suspended catalyst, and out through conduit 17 to scrubber 18. In the scrubber, the stripping medium admixed with vapors of oil stripped from the spent catalyst are scrubbed with a scrubbing menstruum, for instance, water, to recover the valuable hydrocarbons. The scrubbed gases pass out through conduit 19 and the scrubbing menstruum and absorbed hydrocarbons pass through line 20 to a separator diagrammatically represented at 21 from which the menstruum and heavier hydrocarbons pass through line 22 and the light hydrocarbons pass off through line 23. The hydrocarbons may be returned for retreatment or passed to storage.

The hot stripping medium passing upward through the stripper, strips from the catalyst the major portion of vaporizable hydrocarbons contained therein and carries the catalyst gradually upwardly through the stripper. A relatively dense bed of the catalyst accumulates in the stripper and overflows through conduit 24 to the upper portion of the regenerator 25. A small amount of stripping medium, steam, or flue gases, for instance, may be introduced into the lower end of conduit 24 through line 26 for the purpose of maintaining the catalyst in a fluid condition and also further to strip from the catalyst any residual oil or vapors.

The regenerator shown is of a cylindrical type, quite similar to the reactor just described except that the catalyst inlet conduit leads to the upper portion of the regenerator.

Positioned in the lower portion of the regenerator, just above the cone shaped bottom of the regenerator, is a plate 27, perforated at its center portion and otherwise imperforate except for four openings therethrough spaced 90° apart, each opening connecting the lower conical portion of the regenerator with an upwardly projecting riser or standpipe 28, similar to the standpipes 5 of the reactor, just described. As in the reactor, these standpipes extend upwardly to a point preferably well above the top level of the so-called dense phase of the body of catalyst in the regenerator and are similarly equipped with openings 29 spaced or extending along its height for withdrawing catalyst from the catalyst bed. These openings 29 are shown in the drawing as rectangular slots, while the openings 8 are shown as circular. It will be understood, however, that the side openings in standpipes 28, as in standpipes 5, may be either round or rectangular or of any other convenient shape or may extend the entire height of standpipe, the sides of the opening being either parallel or forming a V-shaped slot, such as 9, of Fig. 2 of the drawings. It is desirable, however, that the summation of the areas of the openings in any one standpipe not greatly exceed the cross-sectional area of the vertical passage extending through the standpipe.

Upon contact of the air with the hot catalyst, the coke or carbon deposited on the catalyst is burned as the catalyst gravitates gradually downwardly through the regenerator, air being introduced in the lower portion of the regenerator through line 30.

The air and products of combustion passing upwardly through the regenerator tend to carry the smaller particles of catalyst along in suspension and maintains the bed in a fluid condition.

The products of combustion pass from the upper portion of the regenerator through cyclone separator 31 for the separation of suspended catalyst, the separated catalyst being returned to a point in the regenerator below the upper surface of the dense phase. The products of combustion pass from the separator through conduit 32 to a precipitator or stack, not shown.

The regenerated catalyst is withdrawn through standpipes 28 from zones spaced or extending along the entire height of the catalyst bed and passed by gravity into the lower conical portion of the regenerator and out through regenerated catalyst leg 33 into the lower end of conduit 2 where it is caught up by a stream of preheated charge oil and returned to the reactor, as previously described. The regenerated catalyst leg is provided with a valve arrangement 34, advantageously of the double slide valve type, for controlling the passage of catalyst from the regenerator. This leg is advantageously of sufficient length to form an effective seal against the upward passage of charge oil to the regenerator.

In the operation illustrated, the spent catalyst from the reactor is conveyed to the stripper and stripped by a portion of the hot products of combustion or flue gases passing from the regenerator. For this purpose, a portion of the flue gases is diverted from line 32 through line 35 and booster 36 to line 13 leading into the lower end of conduit 12, as previously described.

The catalyst employed may be of the type conventionally used in fluid catalyst processes, for instance, a silica-alumina type catalyst in finely divided or powdered form. The reaction conditions may, likewise, be those conventionally used in operations of this type and, as understood by the art, the optimum temperatures and pressures will depend primarily upon the type of feed stock used, the particular catalyst employed, and the reaction desired.

In cracking gas oil, for instance, the reaction temperature may, with advantage, be within the range of about 800° to 1,000° F. and the pressure at the top of the reactor within the range of about 5 to 25 pounds per square inch. The regeneration temperature may be within the range of about 950° to 1,200° F. The flue gases passing from the regenerator will usually be under a pressure of about 5 to 15 pounds per square inch and this pressure is, with advantage, boosted to, say, 25 pounds per square inch or higher by the booster.

It will be understood that the present invention is not restricted to the particular embodiment herein described, but is applicable to various modifications of fluid catalyst processes.

Further, it will be understood that the term "gaseous medium" is used in the appended claims to designate the medium to be brought into contact with the catalyst and in addition to true gases is intended to include vapors.

I claim:

1. In the fluid catalyst process for the conversion of hydrocarbons in which the hydrocarbons in vapor phase are passed upwardly through a relatively dense phase fluidized body of solid catalyst in a reaction zone, spent catalyst is withdrawn from the reaction zone and passed to a regenerating zone wherein it is regenerated by passing a gaseous regenerating medium upwardly through a relatively dense phase fluidized body of the catalyst maintained in the regenerating zone, regenerated catalyst is withdrawn from the regenerating zone and returned to the reaction zone and hydrocarbons are separately withdrawn from the reaction zone, the step of uniformly withdrawing catalyst from throughout the height of one of the relatively dense phase fluidized bodies of solid catalyst in one zone and returning it to the other said body of catalyst.

2. In the fluid catalyst process for the conversion of hydrocarbons in which the hydrocarbon in vapor phase is passed upwardly through a relatively dense phase fluidized body of solid catalyst in a reaction zone, spent catalyst is withdrawn from the reaction zone, stripped of oil, regenerated by passing a stream of gaseous regenerating medium in contact therewith, regenerated catalyst returned to the reaction zone and hydrocarbons are separately withdrawn from the reaction zone, the step of uniformly withdrawing the catalyst for regeneration from throughout the height of the relatively dense phase body of catalyst in the reaction zone.

3. In the fluid catalyst process for the conversion of hydrocarbons in which the catalyst after contact with the hydrocarbon in the reaction zone is passed to a regenerating zone wherein it is regenerated by passing a gaseous regenerating medium upwardly through a relatively dense fluidized body of the catalyst and from which regenerated catalyst is withdrawn and returned to the reaction zone, the step of uniformly withdrawing the catalyst for return to the reaction zone from throughout the height of the relatively dense body of the catalyst in the regenerating zone.

4. In the fluid catalyst process for the conversion of hydrocarbons in which the hydrocarbon in vapor phase is passed upwardly through a relatively dense fluidized body of the catalyst in a reaction zone, spent catalyst is passed from the reaction zone to a regenerating zone and regenerated therein by passing a gaseous regenerating medium upwardly through a relatively dense fluidized body of the catalyst and the regenerated catalyst is withdrawn and returned to the reaction zone, the improvement which comprises uniformly withdrawing catalyst for recirculation from throughout the height of the respective relatively dense fluidized bodies of catalyst.

5. Apparatus for effecting intimate and uniform contact between a finely divided, fluidized solid and a gaseous medium comprising a vertically elongated chamber, an inlet for gaseous medium into a lower portion of the chamber, an outlet for withdrawing the finely divided solid from the lower portion of the chamber, a plurality of vertically disposed standpipes extending upwardly from and opening at their lower ends into the lower portion of said chamber, each standpipe being provided with vertically disposed openings along substantially its entire height.

6. Apparatus for effecting intimate and uniform contact between a finely divided, fluidized solid and a gaseous medium comprising a vertically elongated chamber, an inlet for gaseous medium into a lower portion of the chamber, an outlet for withdrawing the finely divided solid from the lower portion of the chamber, a plurality of vertically disposed standpipes extending upwardly from and opening at their lower ends into the lower portion of said chamber, each standpipe being provided with vertically disposed openings along substantially its entire height, the total area of such openings in the respective standpipes approximating the internal transverse sectional area of the standpipe.

7. Apparatus for effecting intimate and uniform contact between a finely divided, fluidized solid and a gaseous medium comprising a vertically elongated chamber, an inlet for gaseous medium into a lower portion of the chamber, an outlet for withdrawing the finely divided solid from the lower portion of the chamber, a plurality of vertically disposed standpipes extending upwardly from and opening at their lower ends into the lower portion of said chamber, each standpipe being slotted from top to bottom on opposite sides, the total area of the slots in the respective standpipes approximating the internal transverse sectional area of the standpipe.

8. Apparatus for effecting intimate and uniform contact between a finely divided, fluidized solid and a gaseous medium comprising a vertically elongated chamber, an inlet for gaseous medium into a lower portion of the chamber, an outlet for withdrawing the finely divided solid from the lower portion of the chamber, a plurality of vertically disposed standpipes extending upwardly from and opening at their lower ends into the lower portion of said chamber, each standpipe being slotted from top to bottom on opposite sides, the slots being progressively wider from bottom to top, and the total area of the slots in the respective standpipes approximating the internal transverse sectional area of the standpipe.

WILLIS S. GULLETTE.

REFERENCES CITED

The following references are of record in the file of this patent:

UNITED STATES PATENTS

| Number | Name | Date |
|---|---|---|
| 2,334,553 | Harding | Nov. 16, 1943 |
| 2,378,542 | Edmister | June 19, 1945 |
| 2,391,334 | Nicholson | Dec. 18, 1945 |